United States Patent [19]

Patrick et al.

[11] Patent Number: 4,542,453

[45] Date of Patent: Sep. 17, 1985

[54] PROGRAM PATCHING IN MICROCOMPUTER

[75] Inventors: Michael J. Patrick, Houston, Tex.; David M. Snider, Cary, N.C.

[73] Assignees: Texas Instruments Incorporated and IBM Corp., Dallas, Tex.

[21] Appl. No.: 350,513

[22] Filed: Feb. 19, 1982

[51] Int. Cl.[4] .......................... G06F 9/00; G06F 7/00
[52] U.S. Cl. .................................................. 364/200
[58] Field of Search ............................... 364/200, 900

[56] References Cited

U.S. PATENT DOCUMENTS 3,911,406  10/1975  McLaughlin et al. ............... 364/200
4,400,798   8/1983  Francis et al. ....................... 365/174

OTHER PUBLICATIONS

IBM Technical Disclosure Bulletin, vol. 16, No. 12, May 1974, pp. 3841–3842.

IBM Technical Disclosure Bulletin, vol. 19, No. 3, Aug. 1976, pp. 1067–1068.

IBM Technical Disclosure Bulletin, vol. 16, No. 8, Jan. 1974.

Primary Examiner—Gareth D. Shaw
Assistant Examiner—John G. Mills
Attorney, Agent, or Firm—John G. Graham

[57] ABSTRACT

A single-chip microcomputer device contains on-chip program storage in a read-only memory (ROM), and this program may be corrected or updated by patching. The ROM addresses are applied to an off-chip memory device containing one bit for each potential ROM address, and each bit is set to mark the beginning address of code to be patched; an interrupt is signalled when one of these set bits is accessed by an address occurring during operation of the microcomputer. The interrupt causes the processor to branch to an off-chip program memory to insert the patch code. The patch ends in a branch back to the on-chip ROM.

14 Claims, 3 Drawing Figures

PROGRAM PATCHING IN MICROCOMPUTER

BACKGROUND OF THE INVENTION

A single-chip microcomputer is a digital processor constructed in a single semiconductor integrated circuit containing a read-only memory for program storage, a read/write memory for data storage, and an arithmetic/logic unit, with control circuitry for executing instruction codes stored in the read-only memory. This code is permanently defined when the semiconductor device is manufactured, so the program cannot be updated or corrected after installation of the part in a system, except by manufacturing a new microcomputer device with different masks to provide the new program code and installing the new device. Aside from the cost, the delay in obtaining microcomputer devices with updated or corrected code is a major factor, measured in months. This delay is in large part administrative, although the procedure includes writing and specifying a new code and debugging the code on emulators, generating new masks, processing semiconductor slices, probe testing, packaging the bars tested good, retesting the finally-assembled units, shipping to the equipment manufacturer, distribution of parts to inventory for the assembly line, final test of systems, etc.

These cost and delay factors have often resulted in the choice of microprocessor devices with off-chip PROM or EPROM program memory instead of microcomputers, even though this alternative is much more expensive. A combined ROM/EPROM with periodic branch from ROM to EPROM as in pending U.S. patent application Ser. No. 194,538 filed Oct. 6, 1980, assigned to Texas Instruments, is one approach to reducing cost by using more ROM instead of more expensive EPROM, yet still allow patching.

Semiconductor devices are most economical when manufactured in large volume, preferably lots of hundreds of thousands of identical units, so a microcomputer is chosen for a system design only when large manufacturing volumes are involved. This can result in waste, however, because if an error is discovered in the code at a late stage in prototyping or preliminary production, there will be large numbers of microcomputer devices in the "pipeline" at the various stages of production, testing and delivery; all of these must be scrapped and new code introduced. To remedy this problem, microcomputer devices are produced with on chip electrically programmable ROMs instead of mask-programmable ROMs for on-chip program storage, but these require a more complex manufacturing process, larger chip sizes, and additional circuitry and terminals for the programming function, as well as having the disadvantage of reduced reliability. These EPROM microcomputers are suitable for the development and prototyping phase, but when the stage of large-volume production is reached the program code is usually committed to mask-programmable ROM for cost considerations. The development and prototyping phases are thus taken care of, but system customizing or retrofitting produces the same delays as before.

It is therefore the principal object of this invention to provide an improved microcomputer system in which correction of programming errors, or program updates, and custom programs or changes in the program code, are all possible even though mask-programmable on-chip ROM is used for program storage. Another object is to provide a method of patching programs executed by a processor.

SUMMARY OF THE INVENTION

In accordance with one embodiment of the invention, these and other objects are accomplished in a single-chip microcomputer device having an on-chip ROM for program storage, with an off-chip patching arrangement for correcting or updating the program code. The ROM addresses are applied to a memory off-chip containing one bit for each potential ROM address; the bit is set for the beginning of code to be patched, and an interrupt is signalled when this address occurs during operation of the microcomputer. The interrupt causes the processor to branch to an off-chip program memory to insert the patch code. The patch ends in a branch back to the on-chip ROM. In another embodiment, only one off-chip memory is used, and this memory is one bit wider than the instruction code. The extra bit is set to indicate that the off-chip code is to be used for the next instruction instead of the on-chip code.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF SPECIFIC EMBODIMENT

Figure 1:
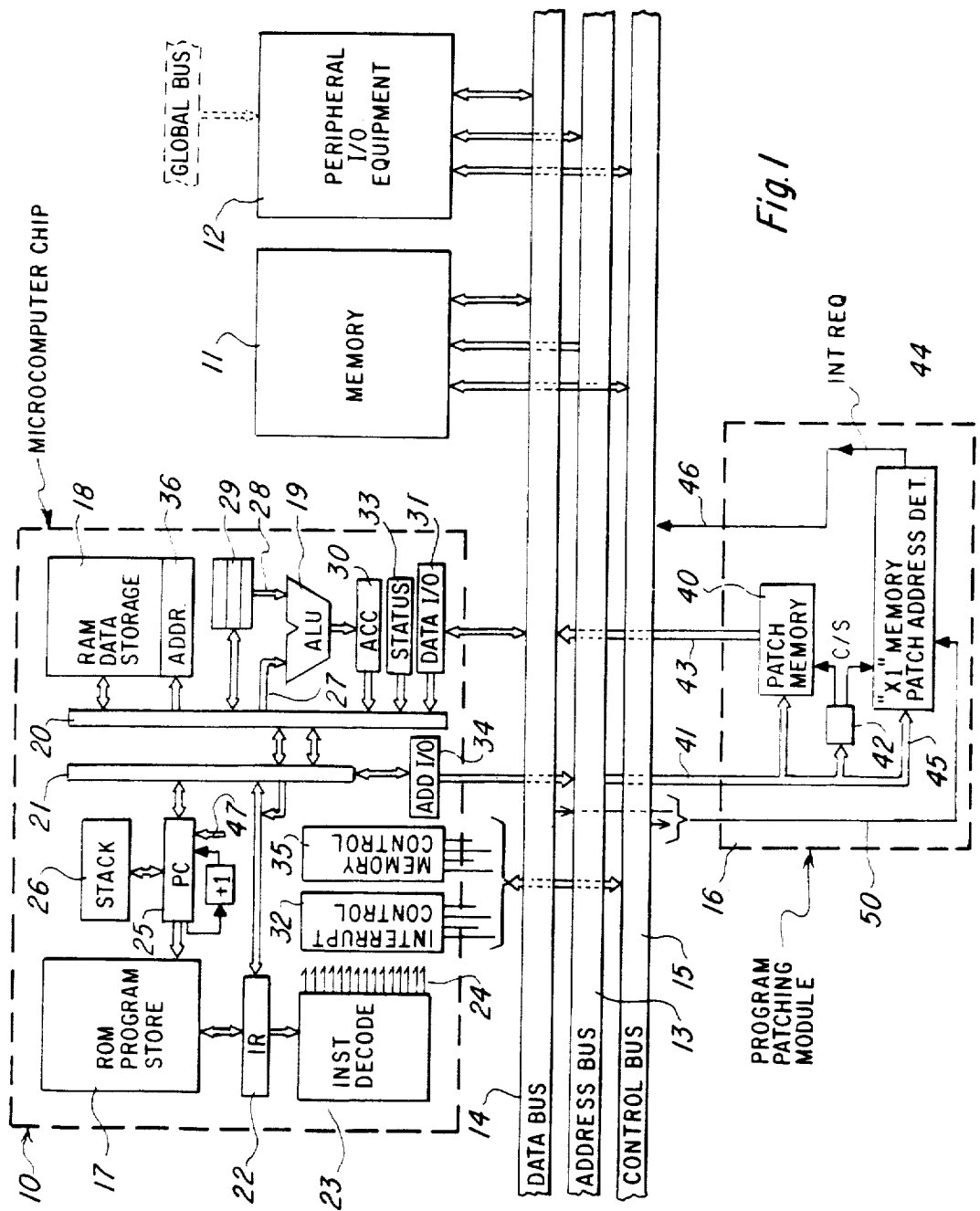
FIG. 1 is an electrical diagram in block form of a microcomputer system with an MOS/LSI microcomputer chip including CPU, ROM and RAM and a program patching arrangement according to the invention.

Referring to FIG. 1, a microcomputer system using the invention may include a single-chip microcomputer device 10 of conventional construction, along with off-chip memory 11 (if needed, and various peripheral input/output devices 12, all interconnected by an address bus 13, a data bus 14, and a control bus 15. According to the invention, a program patching memory module 16 is included for the purpose of supplementing or replacing parts of the program memory within the microcomputer 10.

A single bidirectional multiplexed address/data bus may be used instead of the separate address and data busses as illustrated in FIG. 1, and also the program addresses and data or I/O addresses may be separated on the external busses; the microcomputer may be of the Von Neumann architecture, or of the Harvard type or a combination of the two.

The microcomputer 10 could be one of the devices marketed by Texas Instruments under the part number of TMS 7000, for example, or one of the devices commercially available under part numbers Motorola 6805, Zilog Z8 or Intel 8051, or the like. These devices while varying in details of internal construction, generally include an on-chip ROM or read-only memory 17 for program storage, but also have program addresses available off-chip, as needed for the patch module 16.

A typical microcomputer 10 as illustrated may contain a RAM or random access read/write memory 18 for data and address storage, an ALU 19 for executing arithmetic or logic operations, and internal data and program buses 20 and 21 for transferring data and program addresses from one location to another (the busses 20 and 21 are combined in some devices). Instructions stored in the ROM 17 are loaded one at a time into an instruction register 22 from which an instruction is decoded in control circuitry 23 to produce controls 24 to define the system operation. The ROM 17 is addressed by a program counter 25, which may be self-incrementing or may be incremented by passing its contents through the ALU 19. A stack 26 is included to store the contents of the program counter upon interrupt or subroutine. The ALU has two inputs 27 and 28, one of which has one or more temporary storage registers 29 loaded from the data bus 20. An accumulator 30 receives the ALU output, and the accumulator output is connected by the bus 20 to its ultimate destination such as the RAM 18 or a data input/output register and buffer 31. Interrupts are handled by an interrupt control 32 which has one or more off-chip connections via the control bus 15 for interrupt request, interrupt acknowledge, interrupt priority code, and the like, depending upon the complexity of the microcomputer device 10 and the system. For the purposes of this invention, only one interrupt request line is needed. A reset input RS is also treated as an interrupt. A status register 33 associated with the ALU 19 and the interrupt control 32 is included for temporarily storing status bits such as zero, carry, overflow, etc., from ALU operations; upon interrupt the status bits are saved in RAM 18 or in a stack for this purpose. The address bus 21 is coupled off-chip through address buffers 34 connected to the external bus 13; depending upon the particular system and its complexity, this path may be employed for addressing off-chip data memory and I/O in addition to off-chip program memory. Also, transfer paths between the internal data bus 20 and address bus 21 provide interchange of data and address paths, so addresses to bus 13 may originate in RAM 18, accumulator 30, or instruction register 22, as well as program counter 25. A memory control circuit 35 generates (in response to control bits 24) or responds to, commands to or from the control bus 15 for memory enable, write enable, hold, chip select, etc., as may be appropriate.

In operation, the microcomputer device 10 executes a program instruction in a sequence of machine cycles or state times. That is, in successive states, the program counter 25 is incremented to produce a new address, this address is applied to the ROM 17 to produce an output to the instruction register 22 which is then decoded in the control circuitry 23 to generate a sequence of sets of microcode control bits 24 to implement the various steps needed for loading the buses 20 and 21 and the various registers 29, 30, 31, 34, etc. For example, a typical ALU arithmetic or logic operation would include loading addresses (fields of the instruction word) from instruction register 22 via bus 20 to addressing circuitry 36 for the RAM 18 (this may include only source address or both source and destination addresses), and transferring the addressed data words from the RAM 18 to a temporary register 29 and/or to the input 27 of the ALU; microcode bits 24 would define the ALU operation as one of the types available in the instruction set, such as add, subtract, compare, and, or, exclusive or, etc. The status register 33 is set dependent upon the data and ALU operation, and the ALU result is loaded into the accumulator 30. As another example, a data output instruction may include transferring a RAM address from a field in the instruction register 22 to the RAM address circuit 36 via bus 20, transferring this addressed data from the RAM 18 via bus 20 to the output buffer 31 and thus out onto the external data bus 14; certain control outputs are produced by memory control 35 on lines of the control bus 15 such as memory enable, write, chip select, etc. The address for this data output could be an address on the bus 13 via buffer 34, or alternatively on bus 14 in a previous cycle where it is latched in the memory 11.

The instruction set of the microcomputer 10 may include instructions for reading from or writing into the memory 11 or the I/O ports 12, with the internal source or destination being the RAM 18, program counter 25, temporary registers 29, instruction register 22 etc. Each such operation would involve a sequence of states during which addresses and data are transferred on internal busses 20 and 21 and external busses 13 and 14. Alternatively, the concept of the invention is useful in a microcomputer of the non-microcoded type in which an instruction is executed in one machine state time. What is necessary in selecting the microcomputer 10 is that the program addresses be available off-chip, and that an interrupt procedure be provided.

The program patch arrangement of the invention will be described in terms of 8-bit data paths, although it is understood that the microcomputer system and the patching technique is useful in 8-bit or 16-bit systems, or other architecture such as 24-bit or 32-bit. The primary utility, however, is probably in small systems of the controller type, usually having 8-bit data paths and 12-bit or 16-bit addressing, in which no external memory 11 is needed and the peripheral circuitry 12 consists of merely a coupler or interface so in effect the system of FIG. 1 is an attached processor or coprocessor in a larger system. A bus interface chip such as an IEEE 488 type of device could be included in the peripheral circuitry 12, or indeed the system of FIG. 1 can be functioning as the interface processor; U.S. Pat. Re. No. 29,246 discloses a control arrangement for bus interface according to the IEEE 488 standard.

Figure 2:
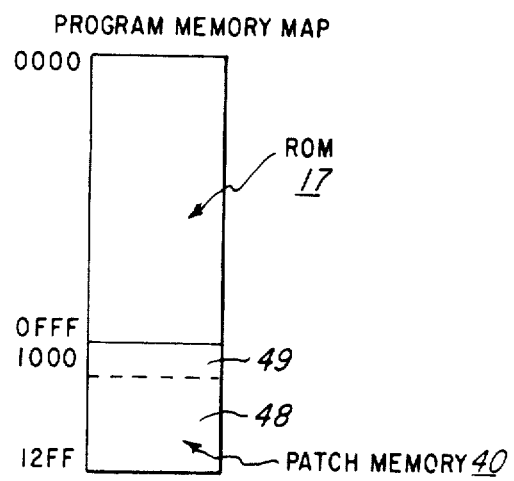
FIG. 2 is a memory map for the logical address space for the microcomputer of FIG. 1.

According to one embodiment of the invention, program patching module 16 for the system of FIG. 1 includes a programmable memory 40 containing instruction words to supplement or replace instructions stored in the ROM 17. The format of the memory 40 matches that of the ROM 17. Thus, if the ROM 17 is in 8-bit bytes, so is the memory 40, whereas if the ROM 17 produces 16-bit instruction words then the memory 40 also produces 16-bit words of the same format. If the microcomputer 10 is a TMS 7000, for example, the instruction words are one, two or three 8-bit bytes, depending upon addressing mode, etc. The memory 40 receives an address via lines 41 from the address bus 13. A decoder 42 may produce a chip select input to the memory 40 based on address bits and an output from the microcomputer 10 via the control bus 15. The output of the memory 40 is connected by lines 43 to the data bus 13–14, so an instruction fetched from memory 40 can be loaded into the instruction register 22 via bus 13–14, I/O buffer 31, and internal bus 20. In every instruction sequence executed by the microprocessor 10, the possibility of a patch exists, so every instruction fetch address asserted by the program counter 25 is transferred via internal bus 21, buffer 34, external bus 13 and lines 41 to the decoder 42 so if the address is in the range of memory 40 it is applied to this memory; the microcomputer uses as the source of the next instruction either the ROM 17 or (ultimately, after processing an interrupt) the memory 40, dependent upon a control arrangement. A patch control memory 44 receives as an address the current contents of the program counter 25, via lines 45 and 41, bus 13, buffer 34, and internal bus 21. The patch control memory 44 contains one bit for each address in the program memory address space; for example, if the ROM 17 contains 4K words ($2^{12}$ or 4096 instruction words) then the memory 44 is a 4K × 1 memory. The bit in memory 44 associated with each address of the ROM 17 is set to a 1 or 0 depending upon whether or not a patch is to be implemented beginning at the next address. For program patch, an interrupt is signalled by a line 46 which is connected via an interrupt request line IntReq in the control bus 15 to the on-chip interrupt control 32. The bit is set in memory 44 at the address just prior to the instruction where the patch is to begin, so the interrupt will have been processed during the execution cycle for which the address of this set bit goes out to memory 44. An interrupt usually causes the incremented program counter 25 contents to be stored in the stack 26, and the contents of the status register 33 to be saved in RAM 18, but for program patching it may not be necessary to save the program counter address since the last instruction in the patch will contain the new program address for ROM 17; the code in ROM 17 immediately following the point where the patch began usually will not be used as it contains an error or has been updated. In any event, the interrupt causes a vector address to be loaded into the program counter 25 via input 47; as an example, this would be an address of 1000 (hex) generated by hardwired connections to Vss and Vdd, as is common practice. This vector address is that of the first location in the address range of the memory 40, as seen in the map of FIG. 2. The processor 10 will now begin executing from the memory 40, and the instruction at 1000 will begin an algorithm which determines which patch is to be used, based on the address in the program counter 25 when the set bit in memory 14 produced the interrupt; this address was saved in stack 26, or could be loaded into a temporary register 29 or RAM 18 by the interrupt procedure, so it can be used in the algorithm to generate an address in the range 48 of FIG. 2 for the particular patch needed at this point. The early addresses in the segment 49 after address 1000 contain a table of contents for the patches in range 48. The algorithm causes the processor to scan this table of contents until it finds a value that matches the stored program counter value where the patch was signalled. The next address generated by a branch at this point will be the starting address of the patch of interest. This new generated address is loaded into the program counter 25 for beginning execution of the patch code which is of variable length. The last instruction of this patch code is a branch to the location in ROM 17 where continued execution is to begin.

An important feature of the embodiment of FIGS. 1 and 2 is that the memory 44 used to detect the occurance of an address to begin a patch is a standard "X1" memory commercially available at low cost. The same function could be produced by a complex set of logic gates for each address to be detected; such an approach would use many more parts occupying much more space on a board and would require extensive time for design, all at many times the cost of the standard X1 memory 44.

The memory 44 may consist of a PROM or EPROM, in which case the patch point bits are set in a PROM or EPROM programmer device before the memory 44 is inserted into the printed circuit board containing the module 16. This would be the simplest embodiment.

Alternatively, the memory 44 may be a static RAM, in which case the patch point bits are set by a start-up routine when the system is reset or initiallized. This routine may be programmed into the PROM 40 and accessed as part of the reset procedure originally coded in ROM 17. This coded data from the PROM 40 in the reset procedure generates the data to be written into the RAM 44 by an algorithm (so that excessive space in the PROM 40 is not used up); write inputs 50 to the memory 44 from the data bus 14 and the control bus 15 provide the write enable command and the one-bit data input for this purpose.

Figure 3:
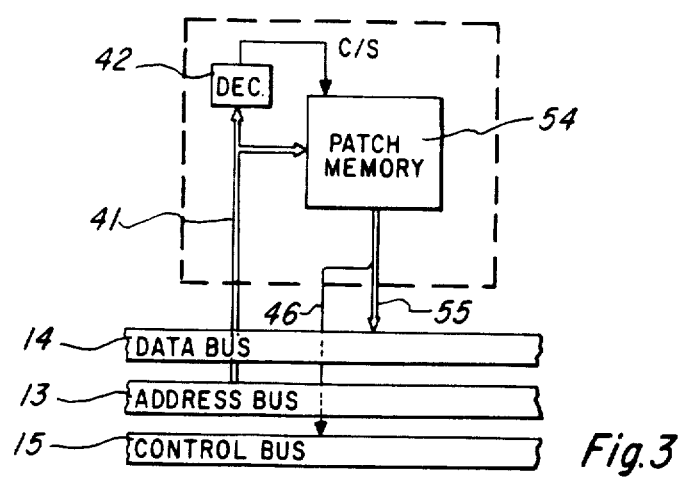
FIG. 3 is an electrical diagram in block form of another embodiment of a patch module used in the system of FIG. 1.

Referring to FIG. 3, another embodiment of the invention uses a single memory device 54 in place of the two memory devices 40 and 44. The memory device 54 has a data output 55 which is one bit wider than the instruction word, i.e., 9-bits for an 8-bit instruction or 17-bits for a 16-bit instruction word. The extra bit is the interrupt bit, replacing the X1 memory 44, and becomes the IntReq line 46 coupled via control bus 15 to the interrupt control 32. All ROM 17 addresses asserted by program counter 25 are coupled via buffers 34, address bus 13 and lines 41 to the address inputs of the memory 54 as before. In this case, however, the address space of the memory 54 is equal to that of the ROM 17. When a patch is to be executed, the extra bit in memory 54 is set to 1 (or zero, depending upon whether IntReq is active-high or active-low) for the address just before the patch code. This bit signals an interrupt to the processor 10 that has the effect of causing the instruction register 22 to be loaded from the bus 20 rather than from the output of ROM 17 for the next instruction. Instead of an interrupt in the usual sense, this can be accomplished by merely generating a "load IR external" control bit 24 instead of a "load IR internal", thus gating an instruction word into IR 22 from data bus 14. The processor thus executes code from the memory 54 instead of from the ROM 17. So long as the processor sees interrupts from line 46, it continues to execute from the memory 54. When the interrupts go away, the processor 10 reverts to executing code from the ROM 17 on the next instruction.

The advantage of the embodiment of FIG. 3 is that only one memory device need be added to the system board to provide patching. For example, the PC board may be delivered with the socket for the memory 54 empty, and the system will operate without any interrupt signalled on line 46, but later a PROM inserted in this socket as the memory 54 to insert patches. Then, if new patches are required that do not affect existing patch areas, the existing PROM could be removed from the socket to have additional code programmed into unused areas of the PROM, then replaced. The method of FIG. 3 has a minimal performance impact on the system because the code is executed on a one-for-one address basis; also patching granularity is to the single address level. However, a given patch code in PROM 54 must be equal to or less than the number of involved addresses in the original code of ROM 17. When the number is less, the extra addresses are filled with no-op instructions. Since the PROM 54 must have the same number of addresses as the internal ROM 17, much of the PROM will be uncoded; a larger and more expensive PROM is needed compared to the embodiment of FIG. 1. Also, a consideration in choosing between the embodiments of FIG. 1 or FIG. 3 is that it is more likely that an existing off-the-shelf processor 10 will execute the patch method of FIG. 1, depending upon the types of interrupts available; that is, the function of gating the input of the instruction register 22 from the data bus instead of the ROM 17 is not always readily implemented on some processors, but this could be solved by having the processor translate to a different address area when executing from external PROM 54, then translating back via an external decoder to the original addresses.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A data processing system comprising:
   (a) a processor containing an arithmetic logic unit, a program store memory with addressing means, data storage means, and control means including an instruction register receiving instruction words from the program store to generate commands for defining the operations of the processor;
   (b) peripheral input/output circuitry for coupling data between the processor and the peripheral equipment;
   (c) bus means connecting terminals of the processor to the peripheral input/output circuitry; and
   (d) program patching means coupled to said bus means, which enables online updating of processor program instructions without modifying the program store, comprising:
     a patch memory for storage of instruction words, addressing means for the patch memory coupled to said addressing means for the program store via said bus means,
     output means for the patch memory coupled via said bus means to the control means in the processor for delivery of instruction words to said control means,
     and patch control means including a patch control memory connected via said bus means to said addressing means for the program store, and addressed simultaneously with the program store memory, and responsive to each address applied to the program store, and producing a control signal to said processor in response to a marker bit being detected in said patch control memory, said control signal being applied to said processor to interrupt a sequence of addresses applied by said addressing means to the program store when an address requiring a patch is detected, said processor generating a new address for the patch code when said interrupt occurs.

2. A system according to claim 1 wherein the processor is a microcomputer device constructed as a single semiconductor integrated circuit.

3. A system according to claim 1 wherein said patch memory is a programmable read-only memory.

4. A system according to claim wherein said patch control means includes a patch control memory device containing one bit for each addressable location in the program store.

5. A system according to claim 4 wherein the processor includes interrupt means coupled to a one-bit output of the patch control memory device to receive said control signal, and functioning by interrupting said sequence of addresses to interrupt execution in the processor of a sequence of said instruction words in order to interpose a patch of a different sequence of instruction words fetched from said patch memory based upon said new address.

6. A microcomputer system comprising:
   a processor device containing a permanently-programmed read-only memory, a program counter, instruction-execution means including an instruction register, and interrupt means, all in a single semiconductor device;
   an auxiliary program memory having an address input and having an output;
   address/data bus means for transferring all of the addresses from the program counter of the processor device to the address input of the auxiliary program memory and for transferring instructions from the output of the auxiliary program memory to the instruction register;
   tag bit storage means also responsive to all of the addresses from the program counter applied to said address input to produce an output bit for each such address;
   the interrupt means of the processor device receiving said output bit from the tag bit storage means and controlling loading of the instruction register either from said read-only memory or from the address/data bus means.

7. A system according to claim 6 wherein the tag bit storage means is in a one-bit wide memory device physically separate from the auxiliary program memory, and the address range of the auxiliary program memory is much less than that of the read-only memory.

8. A system according to claim 7 wherein the auxiliary program memory contains a plurality of patch code instruction sequences and a look-up table of the addresses of the sequences.

9. A system according to claim 6 whererin the tag bit memory is in the same memory device as the auxiliary program memory, and the auxiliary program memory has an address range equal to that of the read-only memory.

10. A method of patching instruction code in a permanently programmed read only memory, while leaving the code in said read only memory in tact, coomprising the steps of:
   applying a sequence of addresses to said read only memory and also applying each address of said sequence of addresses to a separate one bit wide memory device, containing a marker bit for each of said sequence of addresses;
   coupling an interrupt output on the one bit wide memory device to instruction processing means to cause an interruption in said sequence of addresses when the addressed marker bit in said memory device produced at said output is set at a given logic level;
   and if such interruption occurs then applying addresses to said auxiliary memory separate from said read only memory containing patch code, such addresses being outside the range of said sequence of addresses.

11. A method according to claim 10 wherein the one-bit wide memory device is programmed to contain 1 and 0 logic levels depending upon the address locations to be patched.

12. A method according to claim 10 including the step of programming the auxiliary memory to contain a plurality of patch code sequences at different starting addresses in the auxiliary memory.

13. A method according to claim 12 wherein the auxiliary memory contains a look-up table of said different starting addresses.

14. A method according to claim 13 including the step of selecting a starting address from the look-up table based on the address in said sequence which produced said output.

* * * * *